Figure 1:
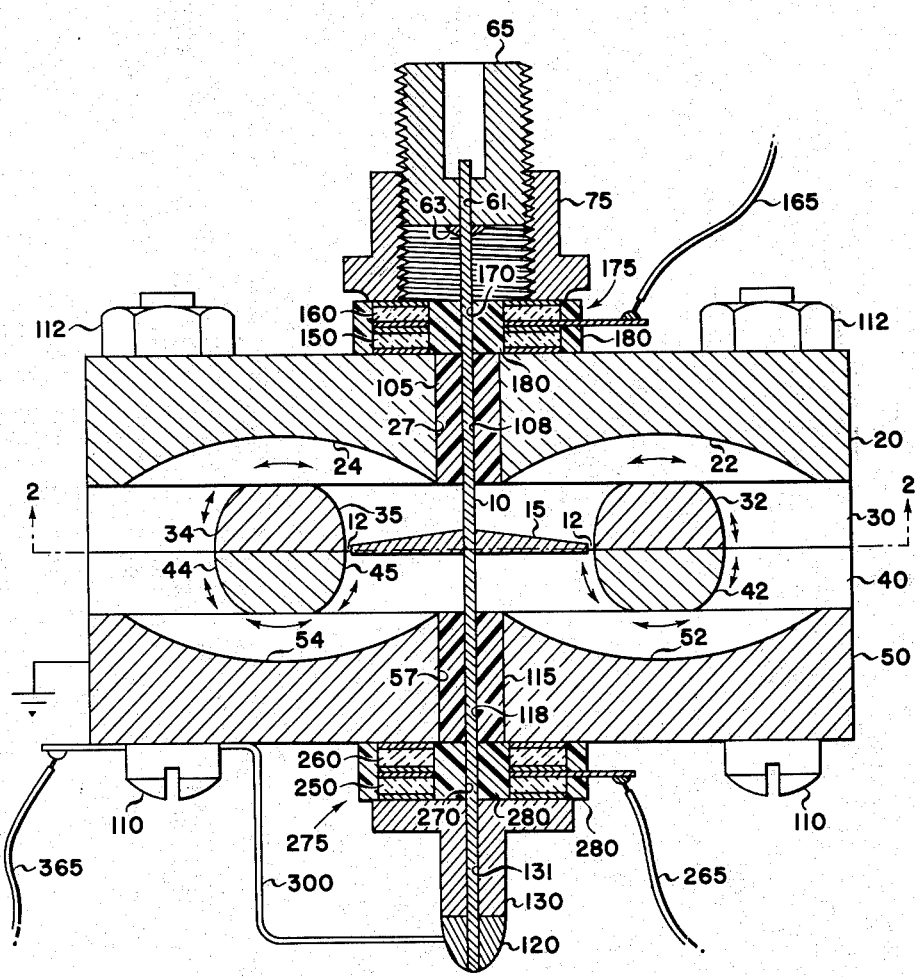

Jan. 14, 1964

L. B. WILNER 3,117,440

DENSITOMETER

Filed Sept. 12, 1960

2 Sheets-Sheet 1

INVENTOR.
LESLIE B. WILNER
BY
*George C. Sullivan*
Agent

Jan. 14, 1964   L. B. WILNER   3,117,440
DENSITOMETER

Filed Sept. 12, 1960   2 Sheets-Sheet 2

INVENTOR.
LESLIE B. WILNER
BY
George C. Sullivan
Agent

United States Patent Office 3,117,440
Patented Jan. 14, 1964

3,117,440
DENSITOMETER
Leslie B. Wilner, Palo Alto, Calif., assignor to Lockheed Aircraft Corporation, Burbank, Calif.
Filed Sept. 12, 1960, Ser. No. 55,496
6 Claims. (Cl. 73—32)

This invention relates to means and methods for measuring the density of a fluid using a oscillating spring system.

Various techniques are presently available for determining the density of a fluid. A particularly advantageous technique for this purpose involves enclosing the fluid to be measured in some convenient enclosure such as a hollow sphere, and then causing the hollow sphere or other enclosure to oscillate at its resonant frequency in a spring system, the resonant frequency of the resultant oscillation being a measure of the density of the fluid enclosed since the mass of the fluid adds to the inertia of the system. While such a system offers several advantages, it has the disadvantage that the enclosure must be non-deformable and carefully mounted to provide an accurate measurement. Also, the enclosure must be kept in an air environment (and even better, in a vacuum) and away from contact with other bodies or structures.

Additionally, elaborate plumbing is required to permit the fluid to be admitted into the hollow enclosure without interfering with the oscillating spring system, particularly if a continuous measurement of density is required. Still further, such previous oscillating spring systems have to transport the fluid from its actual location to the hollow enclosure in which the effective pressure may be quite different from the actual pressure on the fluid, thereby introducing errors into the resulting measurement.

Accordingly, it is the broad object of the present invention to provide a densitometer which overcomes the aforementioned disadvantages of presently known oscillating spring system densitometers.

A more specific object of this invention is to provide a fluid densitometer capable of providing a continuous measurement of the density of a fluid directly within the fluid without having the transfer the fluid to a remote enclosure.

Another object of this invention is to provide a densitometer in accordance with the aforementioned objects which is simple and rugged and is capable of providing a measurement of fluid density with relatively high accuracy.

The above objects are accomplished in a typical embodiment of the invention by immersing a transducer-driven piston of an oscillating spring system into a fixed volume of the fluid whose density is to be measured. As in presently known densitometers in which the fluid is vibrated in an oscillating enclosure, the density of the fluid will then affect the resonant frequency of the system. However, as will hereinafter become evident, the simplicity and direct action achieved by the use of an oscillating piston immersed in the fluid, rather than the conventional oscillating enclosure to which the fluid must be transported, overcomes the forementioned disadvantages inherent in these presently known densitometers.

Figure 2:
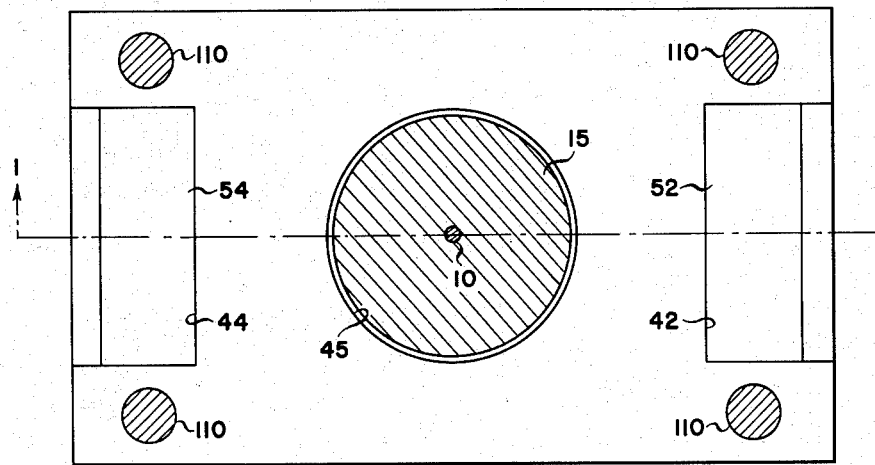

The specific nature of the invention as well as other objects, uses and advantages thereof will clearly appear from the following description and the accompanying drawing in which:

FIGS. 1 and 2 are respectively front and top cross-sectional views of an embodiment of the mechanical structure of a densitometer in accordance with the invention taken along the lines 2—2 and 1—1 as shown.

Figure 3:
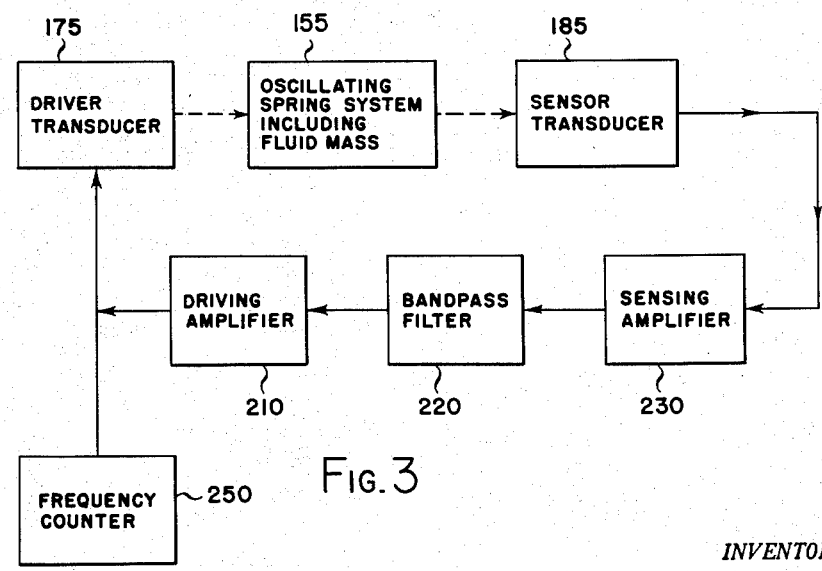

FIG. 3 is a block diagram showing how electrical driving and sensing components may be incorporated with the mechanical structure of FIG. 1 in accordance with the invention, the solid arrows indicating electrical coupling and the dashed arrows indicating mechanical coupling.

In the mechanical structure of the densitometer shown in the cross-sectional views of FIGS. 1 and 2, the frame of the densitometer is made up of four stacked rectangular metal sections 20, 30, 40 and 50 held together by means of screws 110 upon the ends of which are threaded nuts 112, the screws 110 passing through the four corners of each rectangular section as shown in FIG. 2. Adjacent sections 30 and 40 are substantially identical having centrally located bores 35 and 45 passing therethrough with beveled edges as shown. The sections 30 and 40 also have notched portions at their ends indicated at 32 and 34 for the section 30, and 42 and 44 for the section 40. Like the inner surfaces of the bores 35 and 45 these notches 32, 34, 42 and 44 are beveled as shown.

Sections 20 and 50 are also substantially identical, each having cylindrical cut out portions in the faces adjacent the sections 30 and 40, respectively, indicated at 22 and 24 for the section 20, and 52 and 54 for the section 50. These cylindrical cut out portions 22, 24, 52 and 54 permit fluid communication between the cavities formed by the notches 32, 42, 34 and 44 of the sections 30 and 40 and the central cylindrical cavity formed by the bores 35 and 45. The sections 20 and 50 also have centrally located bores 27 and 57 passing therethrough in which bushings 105 and 115 are tightly fitted.

A spring rod 10 passes centrally through the four sections 20, 30, 40 and 50 by means of bores 108 and 118 in the bushings 105 and 115, respectively, and the cylindrical cavity formed by the bores 35 and 45 in the sections 30 and 40. A disk-shaped piston member 15 is rigidly attached to the spring rod 10 at a location so as to be disclosed within the cylinder cavity formed by the bores 35 and 45 of the sections 30 and 40, the piston 15 having a diameter which provides a relatively small clearance between its periphery and the unbeveled surface of the bores 35 and 45 as indicated at 12. The foregoing description of the piston 15 as dis-shaped or circular is only exemplary. The disk 15 may have any shape so long as it is similar, in the geometric sense, to the shape of the cavity formed by bores 35 and 45.

Centrally located adjacent the outer faces of the sections 20 and 50 are a driver transducer 175 and a sensor transducer 275, respectively. The transducer 175 comprises two stack piezoelectric annular discs 150 and 160 having electrode films on their opposite faces, the piezoelectric elements being held together by potting in an epoxy resin indicated at 180. One of the electrode films on the adjacent contacting faces of the elements 150 and 160 is brought out through the epoxy resin 180 to permit an electrical lead wire 165 to be soldered thereto as shown. The piezoelectric elements 150 and 160 are polarized so that adjacent faces are positively polarized while the outer faces are negatively polarized. Thus, a driving signal applied between the lead wire 165 and the frame made up of the metal sections 20, 30, 40 and 50 will act to drive the piezoelectric elements 150 and 160 in the same direction so that the effects of the two are additive.

Similarly, the sensing transducer 275 is made up of stacked piezoelectric annular disks 250 and 260 also having electrode films on their outer faces and a lead wire 265 connected to one of the electrode films on adjacent faces brought out through the epoxy resin 280 in which the disks 250 are potted. As in the driving transducer 175, the adjacent faces of the disks 250 and 260 are positively polarized while the outer faces are negatively polarized. The output signal appearing between the lead wire 265 and the frame will thereby be the sum of the electrical outputs generated by each disk 250 and 260 in response to vibration thereof.

The spring rod 10 passes centrally through the transducers 175 and 275 by means of bores 170 and 270 in the epoxy resin 180 and 280 filling the holes in the annular piezoelectric disks 250 and 260, respectively. The driving transducer 175 is mechanically coupled to the spring rod 10 by means of a nut 75 and a set screw 65 threaded therein having a bore 61 through which the spring rod 10 passes, the spring rod 10 being rigidly held to the set screw 65 by means of a hard solder joint indicated at 63.

At the other end of the stacked sections 20, 30, 40 and 50 adjacent the sensing transducer 275, an end cap 130 is provided having a bore 131 through which the spring rod 10 passes. The spring rod 10 is rigidly held to the end cap 130 by means of a hard solder joint 120 at the end of the end cap 130 as shown. A ground wire 300 having one end embedded in the hard solder joint 120 and the other end held beneath the head of the screw 110 electrically grounds the spring rod 10 to the frame. A lead wire 365 soldered to the ground wire 300 permits convenient electrical connection to be made thereto.

It will now be understood that by turning the nut 75 on the threads of the set screw 65, an initial tension may conveniently be provided for the spring rod 10 and the transducers 175 and 275 will be firmly held in place and be suitably coupled to the spring rod 10, the outer film electrodes of the transducers 175 and 275 making electrical contact with the frame. The driving transducer 175 will then act to longitudinally vibrate the spring rod 10 and piston 15 in response to a driving voltage applied to the transducer 175 between the lead wires 165 and 365, while the sensing transducer 275 will sense the resulting vibration producing an output voltage between the lead wires 265 and 365 in response thereto.

In operation, the mechanical structure shown in FIGS. 1 and 2 is immersed in the fluid whose density is to be measured. The fluid then flows into the structure to fill the fixed volume formed by the notches 32, 34, 42 and 44, the bores 35 and 45, and the cut out portions 22, 24, 52 and 54. The cut out portions 22, 24, 52 and 54 provide communication between the notches 32, 34, 42 and 44 and the bores 35 and 45.

The resulting spring system thus principally comprises the mass of the spring rod 10 and piston 15, and the mass of the fluid within the fixed volume provided by the frame. This spring system may now be set into oscillation at its natural frequency by suitably connecting the driving and sensing transducers 175 and 275 in an electronic oscillator circuit in which feedback is accomplished by means of the spring system.

A typical embodiment of such an electronic oscillator circuit is diagrammatically illustrated in FIG. 3 in which the block 155 represents the oscillating spring system (including the fluid mass) shown in FIGS. 1 and 2, and the dashed arrows from the driving and sensing transducers 175 and 275 represent a mechanical coupling therebetween. A driving amplifier 210 feeds the driver transducer 175 and the output of the sensor transducer 275 is fed to a sensing amplifier to amplify the sensing transducer signal to a suitable level.

A bandpass filter 220 is connected between the driving and sensing amplifiers 210 and 230 to restrict the frequencies flowing in the system to those within the expected range of resonant frequencies of the spring system, thereby preventing interference from noise or signal harmonics. A frequency counter 250 is connected to the output of the driving amplifier 210 to accurately determine the frequency of the output signal therefrom.

It will be understood that the system diagrammatically illustrated in FIG. 3 may be caused to oscillate at the resonant frequency of the spring system 155 which serves as the tuned feedback path for electronic oscillation. The frequency measured by the frequency counter 250, therefore, will be the resultant resonant frequency of the spring system including the effect of the fluid.

Self-oscillating systems in which the resonant frequency of a tunable mechanical system in the feedback path determines the oscillation frequency of an electronic oscillator are well known in the art and have been used in other types of systems as well as in presently known oscillating densitometers. Further details with regard to the electronic components of the system of FIG. 3, therefore, will not be presented, and those skilled in the art will have no difficulty in providing the necessary electronic structure for use in vibrating the spring system structure of FIGS. 1 and 2 at its resonant frequency.

Looking now to the spring system of the structure of FIGS. 1 and 2, it will be seen that as the spring rod 10 and piston 15 are vibrated by the driving transducer 175, the piston 15 will act to move the fluid in the fixed volume back and forth as indicated by the small arrows shown in FIG. 1. The inertia of the fluid adds to the inertia of the vibrating members of the system, thereby acting to decrease the resonant frequency thereof. Since the amount of inertia which the fluid adds to the system is directly proportional to the mass of the fluid in the fixed volume, the inertia added by the fluid will be directly proportional to the density of the fluid. The resonant frequency $f_0$ of the system measured by the frequency counter 250 may thus be written as:

$$f_0 = \frac{1}{2\pi}\sqrt{\frac{K}{M+V\rho}}$$

where K is the stiffness of the spring rod 10, M is the mass of the vibrating mechanical mass including the spring rod 10 and the piston 15, V is a constant depending only upon the geometry of the fixed volume and $\rho$ is the density of the fluid. Since in any given structure the stiffness K, the mass M and the fixed volume V will all be constant, the resonant frequency $f_0$ will be a measure of the density $\rho$ of the fluid.

It is to be understood in connection with the present invention that the specific embodiment described and shown herein is only exemplary and that various modifications in construction and arrangement can be made without departing from the scope of the invention as defined in the appended claims.

I claim as my invention:

1. A densitometer comprising the combination of a substantially rigid frame adapted to be immersed in a fluid whose density is to be measured, said frame having at least one cavity therein and an opening to permit the fluid whose density is to be measured to flow into said cavity, a spring system mounted to said frame and having a piston disposed in said cavity, said piston having a cross-section substantially similar to the cross-section of said cavity and a size slightly smaller than said cavity, and means including a piezoelectric transducer mounted to said frame and coupled to said spring system for oscillating said system at its resonant frequency which is a measure of the density of said fluid, said last mentioned means also including a second piezoelectric transducer mounted to said frame and coupled to said spring system for providing an electrical signal in accordance with the oscillation of said system.

2. A densitometer comprising the combination of a substantially rigid frame adapted to be immersed in a fluid whose density is to be measured, said frame having a centrally located cavity therein communicating with the fluid in which said frame is immersed by means of oppositely disposed openings in said frame, a spring rod passing through said cavity and mounted to said frame at opposite ends thereof, said spring rod having a piston rigidly attached thereto and disposed in said cavity, a driving piezoelectric transducer coupled to said spring rod at one end of said frame, a sensing piezoelectric transducer coupled to said spring rod at the other end of said frame, and electrical circuit means coupled to said transducers for oscillating said spring rod and piston at the resultant resonant frequency thereof which is a measure of the density of said fluid.

3. The invention in accordance with claim 2, wherein said cavity is cylindrically-shaped, said spring rod passes substantially coaxially through said cavity, and said piston is a generally disk-shaped member having its axis parallel to the axis of said rod and a diameter which provides a relatively small clearance between the periphery thereof and the inner surface of said cavity, said driving piezoelectric transducer being adapted to oscillate said rod along the longitudinal axis thereof.

4. The invention in accordance with claim 3, wherein said oppositely disposed openings each communicate with both ends of said cavity so that oscillation of said piston drives said fluid in a generally circular direction at opposite sides within said frame.

5. The invention in accordance with claim 4, wherein means are provided on said frame for applying an initial tension to said spring rod.

6. The invention in accordance with claim 4, wherein said frame is made up of four stacked sections bolted together, said sections having cut out portions chosen to form said cavity and said openings when said sections are stacked together.

References Cited in the file of this patent

UNITED STATES PATENTS

| | | |
|---|---|---|
| 2,137,852 | Nicolson | Nov. 22, 1938 |
| 2,358,374 | Ashcraft | Sept. 19, 1944 |
| 2,472,249 | De Giers et al. | June 7, 1949 |
| 2,633,016 | Millington | Mar. 31, 1953 |
| 2,696,735 | Woodward | Dec. 14, 1954 |